United States Patent [19]
Graf

[11] 3,846,330
[45] Nov. 5, 1974

[54] APPARATUS

[75] Inventor: Walter Luttrell Graf, Nashville, Tenn.

[73] Assignee: E. I. du Pont de Nemours and Company, Wilmington, Del.

[22] Filed: Aug. 16, 1973

[21] Appl. No.: 388,836

[52] U.S. Cl. ............................................. 252/361
[51] Int. Cl. .......................................... B01d 19/00
[58] Field of Search.............. 159/DIG. 4; 252/361; 261/DIG. 19; 55/178, 159; 202/264

[56] References Cited
UNITED STATES PATENTS

| | | | |
|---|---|---|---|
| 3,151,061 | 9/1964 | Orr | 159/DIG. 4 |
| 3,224,964 | 12/1965 | Derenk et al. | 55/178 X |
| 3,238,144 | 3/1966 | Fortman | 252/361 |
| 3,339,345 | 9/1967 | Sebald et al. | 55/178 |

FOREIGN PATENTS OR APPLICATIONS

| | | | |
|---|---|---|---|
| 115,735 | 8/1942 | Australia | 55/178 |
| 531,483 | 1/1941 | Great Britain | |
| 603,593 | 10/1945 | Great Britain | 252/361 |

*Primary Examiner*—Jack Sofer

[57] ABSTRACT

An apparatus to separate and remove foam from an aqueous mixture of foam and finish. The apparatus includes a tank fitted with a plate that partially closes the top of the tank leaving space between the plate and the tank. Recovered finish from a washing process impinges on the plate and runs down through the space between the plate and tank into the tank. Residence time of the finish in the tank is sufficient to allow foam to rise to the top and overflow the tank and be washed away down the tank wall. Foam free finish is pumped from the bottom of the tank.

2 Claims, 2 Drawing Figures

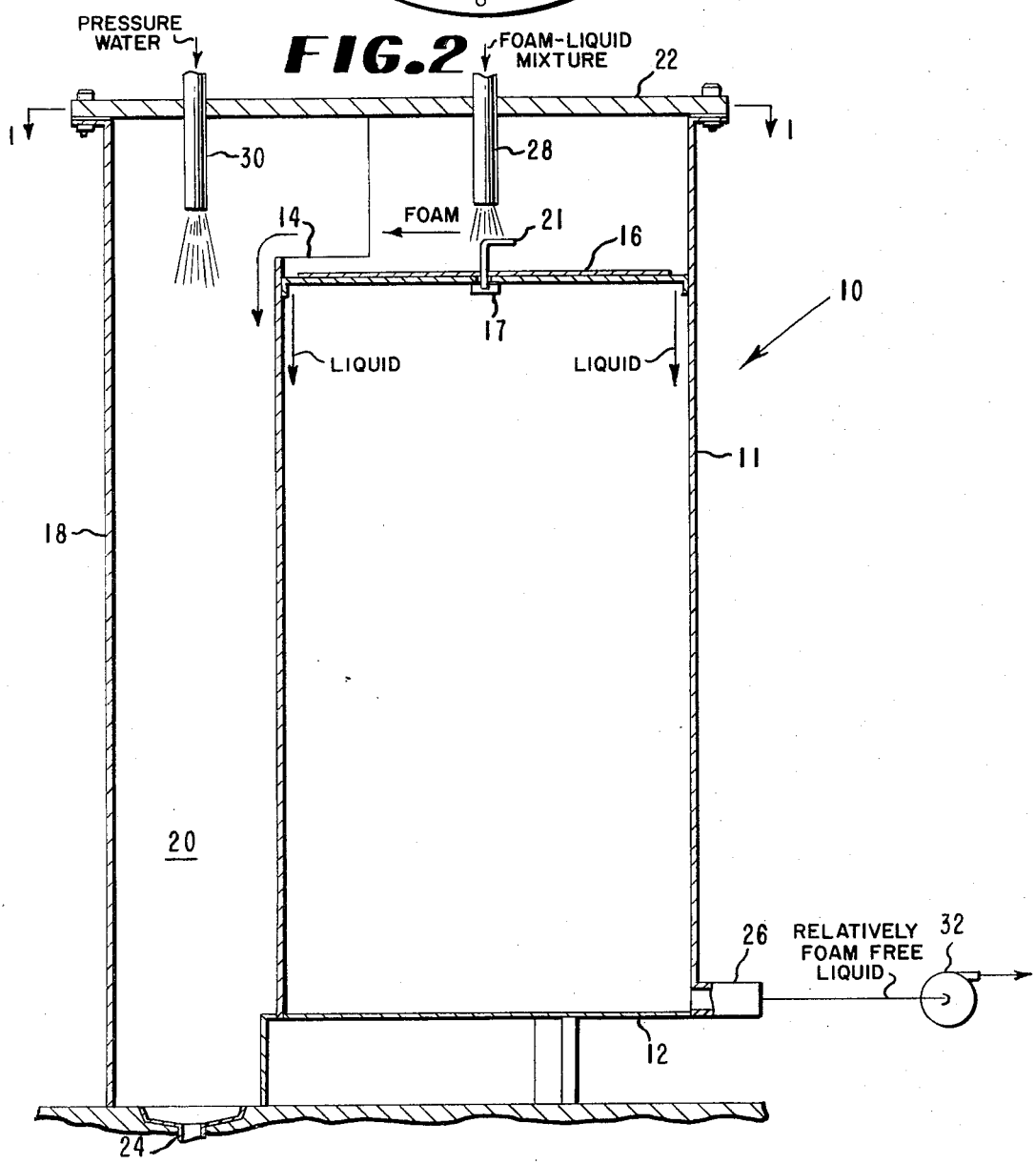

APPARATUS

BACKGROUND OF THE INVENTION

This invention relates to equipment for the transfer of liquids. More particularly, it is an apparatus to separate and remove foam from a foam-liquid mixture.

The transfer of liquids through the pumps, pipes and tanks of a liquid transporting system frequently causes air or other gases to be entrained along with the liquid. Foaming often results. This foaming may cause centrifugal pump cavitation, temporary loss of pressure or overflow of collection tanks. Chemical additives have been used in the past to reduce the amount of foaming. These additives are frequently ineffective. Further, they add additional, sometimes undesirable, chemicals to the fluid mixture. It is the object of this invention to describe an apparatus for mechanically separating and removing foam from a foam-liquid mixture.

SUMMARY OF THE INVENTION

An apparatus for separating and removing foam from a foam-liquid mixture flowing from a source, said apparatus comprising: a base; a continuous upstanding wall attached to the base forming an open top tank, a portion of said wall being removed at the top of the tank forming a weir in said wall; a plate positioned in said tank normal to said wall, said plate having a cross-sectional area smaller than the cross-sectional area of the tank and being located just below said weir; a semi-continuous upstanding wall extending from opposed locations on said continuous wall to form a chamber adjacent said tank, said chamber being in communication with said step in said continuous wall; a cover sealing the top of said tank and said chamber; a drain in communication with the bottom of said chamber, said tank having an outlet near the bottom portion thereof; and an inlet pipe through said cover having one end positioned above said plate in said tank with the other end connected to said source of foam-liquid mixture.

BRIEF DESCRIPTION OF THE DRAWINGS

FIGS. 1 and 2 are top and side elevation views, respectively, of the preferred embodiment of the invention.

DETAILED DESCRIPTION OF THE PREFERRED EMBODIMENT

In the drawing, a tank generally designated as 10 is formed of a continuous upstanding wall 11 attached to a base 12. A portion of the sidewall 11 is removed at the top of the tank to form a weir or step 14. This arrangement directs all overflow from the tank out one side over step 14. A flat plate 16 is positioned in tank 10 and supported by brackets 17 so that the top surface of the plate is normal to the wall 11 and located just below the edge of step 14. A handle 21 is attached centrally of the plate to assist in its removal from the tank. The cross-sectional area of plate 16 is less than the cross-sectional area of tank 10 leaving an annular opening 19 between the edge of plate 16 and the wall 11 of the tank. A semi-continuous upstanding wall 18 extends from opposed locations on wall 11 to form a chamber 20 adjacent the stepped portion of the tank 10. The tank and its attendant chamber are positioned in the vicinity of a floor drain 24 to permit overflow from the tank to be contained in chamber 20 and directed to drain 24. A cover 22 is bolted to a flange on top of walls 11 and 18 and through the cover two pipes 28, 30 for introducing foam-liquid mixture to tank 10 and pressurized water to chamber 20, respectively. Tank 10 is also supplied with an outlet 26 near the bottom which in turn may be connected to a pump 32 as schematically illustrated in FIG. 2.

In operation, a mixture of liquid and foam flows through inlet pipe 28 and impinges on plate 16. The liquid runs over the edges of the plate into the tank 10, while the foam either runs off the plate over the step 14 at the side of the tank or rises to the surface of the liquid in tank 10 and is discharged through annular opening 19 over step 14. Foam which spills over the side of the tank runs down through chamber 20 to floor drain outlet 24. If desired, a spray of water may be injected through pipe 30 to flush away the foam.

The area of the annular opening 19 between the cover plate 12 and the tank wall must be greater than the cross-sectional area of inlet pipe 28 and must be large enough to permit unrestricted flow of liquid into the tank and to allow foam which rises to the surface of the liquid inside the tank to be expelled upward through annular opening 19 and over step 14. Desirably, opening 19 should also be sufficiently narrow to force some of the foam from the impinging mixture over step 14. The exact size of the annular opening will depend on the foam-liquid characteristics of the particular fluid (e.g., viscosity, foam-liquid ratio, etc.) and can be easily determined empirically.

Breaking the foam-liquid mixture over the sharp surface of the top of plate 16 will also increase the rate of breaking up of the bubbles in the foam.

The minimum residence time of the foam-liquid mixture in the tank 10 will also depend on the characteristics of the fluid system. The time should be ample to allow the foam to rise to the surface of the liquid. Typically, this is less than five minutes. Foam-free liquid may then be withdrawn from the bottom of the tank 10 by pump 32. A low level pump cutoff may be used to prevent the liquid level from falling so low as to cause foam pick-up or decrease the residence time of the liquid to less than the desired amount.

This invention is applicable to the transport of any liquid which has a tendency to foam. It is of particular value in separating and removing foam from mixtures of oil and water emulsions such as textile finishes.

EXAMPLE

An apparatus essentially equivalent to the one shown in the drawing is constructed to defoam an aqueous foam-liquid mixture of a textile finish consisting of 98 percent water and 2 percent of a combination of ionic compounds and nonionic ethylene oxide condensates of the type disclosed in Arnold, U.S. Pat. No. 3,457,340. The tank size is about 23 inches high (58 cm.) by 12 inches (31 cm.) in diameter and holds approximately 3 gallons (11 l.). The annular opening around the top cover is 0.5 in. (1.3 cm.) wide. The tank is equipped with a low level cut-off switch for the pump. A liquid residence time of 15 to 30 seconds is found to be adequate to remove most of the foam. The system successfully provides essentially foam-free finish to subsequent processing stations. The apparatus may be operated continuously.

What is claimed is:

1. An apparatus for separating and removing foam from a foam-liquid mixture flowing from a source, said apparatus comprising: a base; a peripherally continuous upstanding wall attached to the base forming an open top tank, a portion of said wall being removed at the top of the tank forming a weir in said wall; a plate positioned in said tank normal to said wall, said plate having an area slightly smaller than the cross-sectional area of the tank and being located just below said weir to form a free annular space between plate & wall to permit liquid to flow into said tank; a second upstanding wall joined to and sealingly terminating at opposed locations on said continuous wall to form a chamber adjacent said weir in said tank to trap overflow foam from said weir; a cover sealing the top of said tank and said chamber; a drain in communication with the bottom of said chamber for removal of overflow foam, said tank having an outlet near the bottom portion thereof for removal of foam free liquid; and an inlet pipe through said cover having one end positioned above said plate in said tank with the other end connected to said source of foam-liquid mixture.

2. The apparatus as defined in claim 1, including a spray nozzle located near the top of said chamber and a source of pressurized water connected to said spray nozzle to wash down foam.

* * * * *